(12) United States Patent
Silva et al.

(10) Patent No.: US 9,164,357 B1
(45) Date of Patent: Oct. 20, 2015

(54) EXTENDING SENSOR DYNAMIC RANGE BY USE OF A PHOTOCHROMIC FILTER

(71) Applicant: BAE SYSTEMS Information And Electronic Systems Integration Inc., Nashua, NH (US)

(72) Inventors: Raymond J. Silva, Saugus, MA (US); Gerard M. Perron, Acton, MA (US); Scott A. Derushia, Amherst, NH (US); James D. Targove, Lunenberg, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 71 days.

(21) Appl. No.: 13/948,471

(22) Filed: Jul. 23, 2013

Related U.S. Application Data

(60) Provisional application No. 61/674,427, filed on Jul. 23, 2012.

(51) Int. Cl.
*G02F 1/03* (2006.01)
*G03B 11/00* (2006.01)
*H04N 5/225* (2006.01)
*G02B 5/23* (2006.01)
*G02F 1/01* (2006.01)

(52) U.S. Cl.
CPC ........ *G03B 11/00* (2013.01); *G02B 5/23* (2013.01); *G02F 1/0126* (2013.01); *H04N 5/2254* (2013.01)

(58) Field of Classification Search
CPC .................................. G02B 5/23; G02F 1/0126
USPC ............................................................. 359/241
See application file for complete search history.

(56) References Cited

U.S. PATENT DOCUMENTS

| 7,619,680 B1 * | 11/2009 | Bingle et al. ................. 348/361 |
| 2010/0206851 A1 * | 8/2010 | Nakatate et al. ............... 219/75 |

* cited by examiner

*Primary Examiner* — William Choi
(74) *Attorney, Agent, or Firm* — Sand & Sebolt; Joseph A. Sebolt; Daniel J. Long

(57) ABSTRACT

A system and method for enhanced conditioning light so a camera can capture images from it in a variety of brightness ranges is presented. A camera has an optical lens and a photochromic filter. The photochromic filter may be placed in front of the lens. The photochromic filter extends an exposure range of the camera without the need for a mechanical iris.

21 Claims, 2 Drawing Sheets

EXTENDING SENSOR DYNAMIC RANGE BY USE OF A PHOTOCHROMIC FILTER

CROSS REFERENCE TO RELATED APPLICATION

This application claims priority from U.S. Provisional Application Ser. No. 61/674,427, filed Jul. 23, 2012; the disclosure of which is incorporated herein by reference.

BACKGROUND OF THE INVENTION

1. Field of Invention

The current invention relates generally to apparatus, systems and methods related to optics. More particularly, the apparatus, systems and methods relate to optics used in cameras. Specifically, the apparatus, systems and methods provide for a photochromic filter which reacts to Ultra-Violet (UV) light, reduces the transmission through the camera optics in bright sunlight; thereby extending the exposure range of the camera without the need for a mechanical iris.

2. Description of Related Art

Traditionally, a camera that uses a complementary metal-oxide-semiconductor (CMOS) image sensor that needs to operate over a wide range of light (bright sunlight to ¼ moon illumination) is not capable of providing a full dynamic range of coverage. Cameras in this situation normally would employ variable iris diaphragms to allow widely for varying light conditions. This mechanical solution creates extreme size, weight, and power constraints. For applications such as the Nano Unmanned Aerial Systems (Nano-UAS) and Micro-Unmanned Aerial Systems (MUAS), the size, weight, and power of a mechanical iris is prohibitive. What is needed is a better optics for use in cameras.

SUMMARY

The preferred embodiment of the invention includes a camera that can capture images from variety of brightness ranges. The camera has an optical lens and a photochromic filter. The photochromic filter is placed in front of the lens. The photochromic filter extends an exposure range of the camera without the need for a mechanical iris.

Another configuration is a method of processing an image in a camera. The method begins by passing light through a photochromic filter to product filtered light. Next, the filtered light is passed through optics to produce focused light. An image from the focused light is captured at a sensor. Either a digital or an analog image may be captured.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
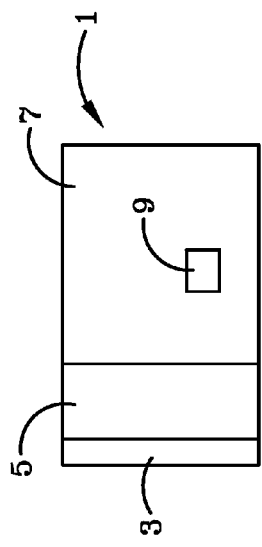
FIG. 1 illustrates the preferred embodiment of a camera with a photochromic filter.

FIG. 1 illustrates a sample embodiment of a camera 1 that includes a photochromic filter 3, optics 5 (e.g., one or more lenses) and image processing logic 7. "Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

The photochromic filter 3 of FIG. 1 may be a separate component from the optics 5 (or a lens) of the camera. In other configurations, the photochromic filter may be deposited directly onto the optics 5 of the camera 1. The image processing logic 7 processes images collected by the filter 3 and optics 5. The photochromic filter 3 has a property of transmitting less light through the photochromic filter as the amount of light impinging on the photochromic filter increases. The process logic 7 can include a complementary metal-oxide-semiconductor (CMOS) image sensor or the like and capture images at this sensor. In the preferred embodiment, the images are digitized into digital images, however, in other embodiments they can be analog images. In some configurations, the image processing logic 7 can store the digitized images in a memory 9 in the camera 1.

A photochromic filter 3 is especially useful in systems such as Nano-UAS and other applications demanding small size, lower power, and low weight. The filter 3 provides for the operation of the camera 1 over a very wide dynamic range from ¼ moonlight to bright, sunlight conditions. Photo-chromic filters exhibit the property of changing transmission based on the amount of UV light that impinges on the filter. In applications such as Nano-UAS, it is desirable to achieve great attenuation of light during the day, and as little attenuation as possible in dusk/dark conditions. As mentioned previously, the selected photo-chromic filter 3 can achieve up to 8× attenuation to the sensor in bright sunlight, while less than 10% attenuation at night. The use of a photochromic filter in this application satisfies a unique set of circumstances and does so without consuming any power or adding any significant weight or volume to the camera 1.

Figure 2:
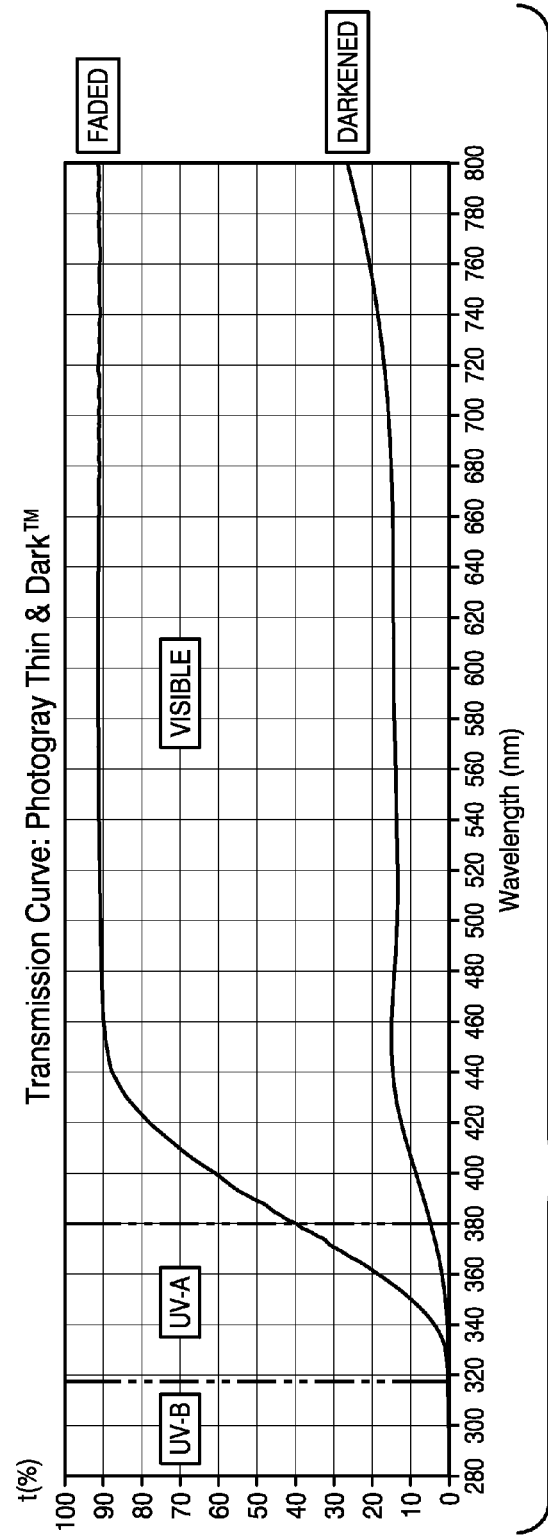
FIG. 2 is a response curve for a typical photochtromic material such as Corning's Photogray Thin&Dark™ (transmission vs. wavelength).
Figure 3:
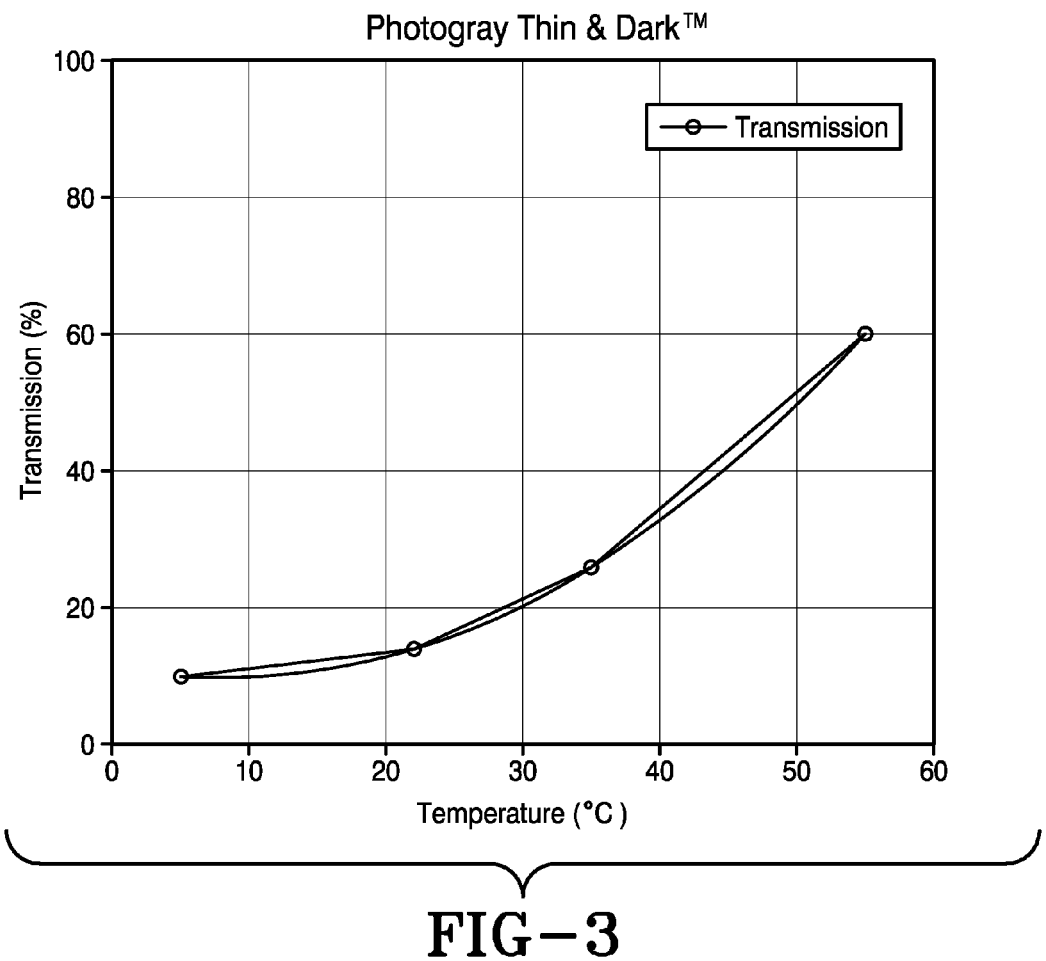
FIG. 3 is a response curve for Corning's Photogray Thin&Dark™ as a function of temperature.

The Fairchild Imaging (FI) CIS1023 camera was developed for BAE Systems. The CIS1023 camera has excellent performance in very low light and also operates over a wide dynamic range of $>10^7$ LUX using various electronic settings. Specifically, imaging from ¼ moon (0.01 LUX) to bright sunlight (>100,000 LUX) without the need for a mechanical iris system. This is desirable because, as stated previously, the iris system increases the size and weight of the system. While favorable results were achieved for low light conditions, the camera was unable to operate fully (unsaturated) in bright sunlight. However, photo-chromic materials are easily available as they are used in the eye glass industry. The addition of a photo-chromic material can provide up to 8× attenuation at 68° F. One material that achieved good results is produced by Corning Inc. and is called Photogray Thin&Dark™ the response curve of which (transmission vs. wavelength) is illustrated in FIG. 2. Additionally, FIG. 3 illustrates the performance of Photogray Thin&Dark™ as a function of ambient temperature. As one can see, the transmission increases as a function of temperature.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
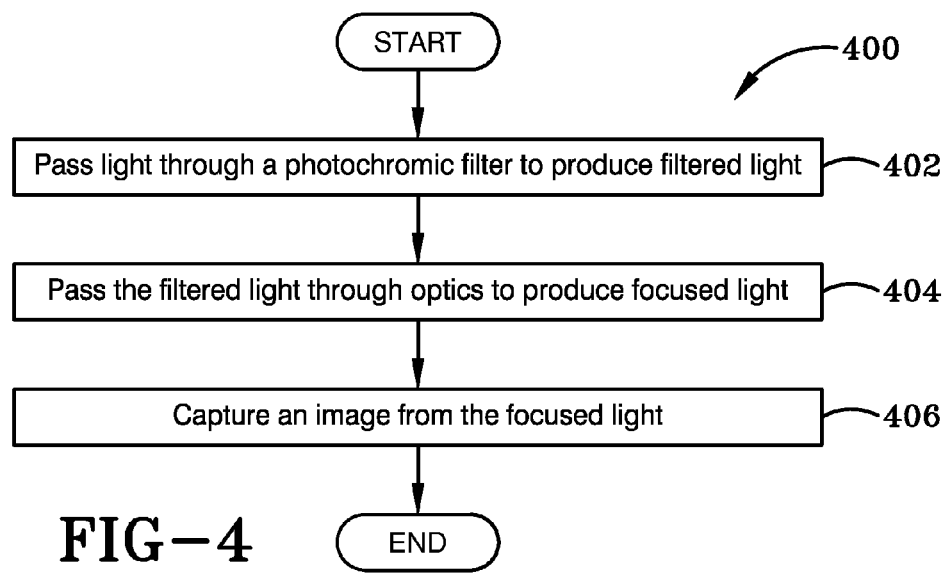
FIG. 4 illustrates an embodiment of a method for processing an image in a camera.

FIG. 4 illustrates a method 400 of method processing an image in a camera. The method 400 begins by passing light through a photochromic filter, at 402, to product filtered light. Next, the filtered light is passed through optics, at 404, to produce focused light. In other embodiments, the light may pass through photochromic material on a lens of the optics so that the filtering and the passing through optics occur simultaneously. An image from the focused light is captured, at 406. Either a digital or an analog image may be captured by a sensor.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A camera comprising:
    an optical lens;
    a photochromic filter in front of the lens configured to extend the exposure range of the camera without the need for an iris; and
    wherein the photochromic filter is deposited directly onto the optical lens, and wherein the photochromic filter provides up to 8 times attenuation at 68 degrees Fahrenheit.

2. The camera of claim 1 wherein the photochromic filter is formed with Corning Incorporated's Photogray Thin & Dark material.

3. The camera of claim 1 further comprising:
    image processing logic configured to digitize images captured by the optical lens to create digital images.

4. The camera of claim 1 further comprising:
    a memory configured to store the digital images.

5. The camera of claim 1 wherein the camera operates in a Nano Unmanned Aerial System (Nano-UAS).

6. The camera of claim 1 wherein the optical lens and the photochromic filter are separate components.

7. The camera of claim 1 wherein the photochromic filter has a property of transmitting less light through the photochromic filter as the amount of light impinging on the photochromic filter increases.

8. The camera of claim 1 wherein the photochromic filter does not consume any power.

9. The camera of claim 1 wherein the camera can capture images from 0.01 LUX to over 100,000 LUX.

10. The camera of claim 1 wherein the camera is configured for use in a Nano Unmanned Aerial Systems (Nano-UAS), and wherein the camera weighs less than eight ounces.

11. The camera of claim 10 wherein the camera weighs less than one ounce.

12. A method of processing an image in a camera comprising the steps of:
    passing light through a photochromic filter deposited directly onto an optical lens to produce filtered light;
    passing the filtered light through optics to produce focused light; and
    capturing an image from the focused light;
    wherein the camera is configured for use in a Nano Unmanned Aerial Systems (Nano-UAS) and weighs less than eight ounces.

13. The method of claim 12 wherein the passing light through a photochromic filter and the passing the filtered light through optics occur at the same time.

14. The method of claim 12 further comprising the step of:
    capturing the image inside the camera.

15. The method of claim 12 wherein the capturing further comprises:
    capturing a digital image using a complementary metal-oxide-semiconductor (CMOS) image sensor.

16. The method of claim 12 further comprising the step of:
    storing the image inside the camera with digital sensors.

17. A camera comprising:
    an optical lens; and
    a photochromic filter in front of the optical lens requiring incoming light to first pass through the filter before passing through the optical lens, wherein the filter is configured to extend the exposure range of the camera without the need for a variable iris;
    wherein the camera is configured for use in a Nano Unmanned Aerial Systems (Nano-UAS) and weighs less than eight ounces.

18. The camera of claim 17, wherein the filter consumes no power and is scalable in size to fit the lens.

19. The camera of claim 17, wherein the photochromic filter is deposited directly on the lens.

20. The camera of claim 17, wherein the photochromic filter provides up to 8 times attenuation at 68 degrees Fahrenheit.

21. A camera comprising:
an optical lens; and
a photochromic filter in front of the optical lens requiring incoming light to first pass through the filter before passing through the optical lens, wherein the filter is configured to extend the exposure range of the camera without the need for a variable iris, and wherein the photochromic filter provides up to 8 times attenuation at 68 degrees Fahrenheit.

* * * * *